US006898882B2

(12) United States Patent
Kim

(10) Patent No.: US 6,898,882 B2
(45) Date of Patent: May 31, 2005

(54) SIGNBOARD DEVICE

(75) Inventor: Yong Soo Kim, Goyang (KR)

(73) Assignee: Hanyang Frame Co., Ltd., Gyeonggi-do (KR)

(*) Notice: Subject to any disclaimer, the term of this patent is extended or adjusted under 35 U.S.C. 154(b) by 71 days.

(21) Appl. No.: 10/369,827

(22) Filed: Feb. 18, 2003

(65) Prior Publication Data

US 2004/0031178 A1 Feb. 19, 2004

(30) Foreign Application Priority Data

Aug. 17, 2002 (KR) ................................ 10-2002-0048641

(51) Int. Cl.[7] .......................... G09F 15/00; F16M 13/00

(52) U.S. Cl. ................ 40/607.1; 40/606.18; 40/607.02; 248/345.1; 248/519

(58) Field of Search .............................. 40/572, 606.14, 40/606.18, 607.02, 607.04, 607.05, 607.09, 607.1, 607.11, 607.01; 52/38, 170, 296, 736.4; 248/345.1, 357, 519, 523

(56) References Cited

U.S. PATENT DOCUMENTS

| | | | | | |
|---|---|---|---|---|---|
| 354,303 | A | * | 12/1886 | Case | 40/607.11 |
| 1,812,117 | A | * | 6/1931 | Rastetter | 403/359.5 |
| 2,083,258 | A | * | 6/1937 | Fisher | 40/572 |
| 3,462,110 | A | * | 8/1969 | Cheslock | 248/219.4 |
| 3,572,223 | A | * | 3/1971 | Vierregger | 52/296 |
| 4,201,975 | A | * | 5/1980 | Marcus | 340/908 |
| 4,458,455 | A | * | 7/1984 | Tollstoff de Voss | 52/38 |
| 4,480,403 | A | | 11/1984 | Williams | |
| 4,910,901 | A | | 3/1990 | Boyar | 40/607 |
| 5,230,176 | A | | 7/1993 | Schomaker | 40/607 |
| 5,398,170 | A | * | 3/1995 | Lee | 362/559 |
| 5,704,580 | A | * | 1/1998 | Peery, Jr. | 248/345 |
| 5,903,991 | A | | 5/1999 | Sasse | 40/607 |
| 6,550,731 | B1 | * | 4/2003 | Kim | 248/223.41 |

FOREIGN PATENT DOCUMENTS

| | | | | |
|---|---|---|---|---|
| GB | 2126271 | | 3/1984 | |
| GB | 2260842 | * | 4/1993 | 40/607.02 |
| JP | 11-174967 | | 7/1999 | |
| WO | WO 86/00453 | | 1/1986 | |

* cited by examiner

*Primary Examiner*—Brian K. Green
(74) *Attorney, Agent, or Firm*—Sheridan Ross PC

(57) ABSTRACT

A signboard device exhibiting information regarding roads, buildings or street names is disclosed. The device includes a post having a plurality of fitting grooves at its outer surface; a base joined to a concrete foundation, the base having a post-seating stepped recesses comprised of two concentric recesses; a post cover unit comprised a lower cover, a cylindrical intermediate cover and an upper cover; a signboard unit comprised of a signboard frame assembly and a pair of signboards attached to the stepped lines of the signboard frame assembly; and a stopper for fixing the signboard frame assembly to the post. The device enables one or more signboards to be easily installed on a post, and has excellent structural strength and an adaptable appearance.

16 Claims, 10 Drawing Sheets

SIGNBOARD DEVICE

BACKGROUND OF THE INVENTION

1. Field of the Invention

The present invention relates to a signboard device installed on a roadside to exhibit information regarding roads, buildings, or street names for convenience of drivers or pedestrians, and more particularly to a signboard device which allows a signboard showing driving or walking information to be easily and stably attached to a post and which provides an acceptable appearance of the signboard and the post in order to improve the cityscape.

2. Description of the Prior Art

In general, various road signs, which are intended to show drivers and pedestrians information relating to dangerous circumstances of a road to assure safety and smooth driving conditions, and which are further intended to provide drivers and pedestrians with information relating to a road, such as direction of a road, distance to a destination, and notable destination points, are installed on roadsides for drivers' and pedestrians' convenience.

Such a signboard is arbitrarily manufactured into a desired shape and size and installed on a post at a roadside to allow drivers and pedestrians to distinctly recognize its communicative information.

Accordingly, a conventional signboard device includes a post having a proper height, and a signboard hung on a cantilever beam fixed to an upper part of the post.

In such a conventional signboard device, a cantilever hanger is provided at its end with a band clamp, which is comprised of a pair of semicircular clamping bands, each clamping band having a pair of flanges at either end. The pair of clamping bands are placed on an outer surface of a post such that the pair of clamping bands face each other. Thereafter, the facing flanges of the clamping bands are fastened by bolts, so that the cantilever hanger is horizontally supported on the post. Subsequently, a pair of hinge brackets are coupled to sides of an upper end of a signboard. The hinge brackets are rotatably connected to two pairs of lugs spacedly provided at a lower portion of the cantilever hanger by hinge bolts and hinge nuts.

However, since the conventional signboard device has the band clamp, comprised of a pair of clamping bands which are completely separated from each other, the band clamp must be fastened by bolts at both its ends. Furthermore, since the hinge brackets of the signboard must be connected to the lugs of the cantilever hanger by hinge bolts and hinge nuts, respectively, an operation of coupling the signboard to the post is considerably complicated.

In addition, since the band clamp can accommodate only one signboard, whereas a plurality of signboards need be installed on one post, a plurality of band clamps, corresponding to the number of needed signboards, must be prepared. In this case, the installation operation of the signboards is considerably complicated, production cost is increased and scenery is significantly spoiled.

Furthermore, although the respective components, manufactured from an iron material, are then coated with paint, the components are apt to be oxidized and corroded due to paint damage at their coupled portions after an extended period of time, thereby causing contamination of the post and reduction of its service life, if not in fact frequent change of the post.

To overcome these problems of the conventional signboard, signboard devices in which a plurality of signboards can be easily installed on a post are proposed in publications, for example, in Korean Patent No. 0245545 and Korean Utility Model No. 0225257.

According to the above Patent and Utility Model, a post is provided at its outer surface with a plurality of radial fitting grooves, into which sliding holders are selectively fitted. By inserting signboards between forked plates of the sliding holders and tightening the signboards by bolts, a plurality of signboards can be easily installed on one post.

However, the above conventional signboard devices have disadvantages in that since the signboard must be manufactured using a thin plate, due to the fact that the signboard must be fitted into a narrow gap between the two fork plates of the holder and then held thereto, the signboard is inevitably weak in its structural strength and thus apt to be bent or deformed by collision with automobiles or even the force of the wind.

Furthermore, since reflective sheets or fluorescent material must be provided on the signboard in order to provide favorable visual effectiveness under poor viewing conditions such as at night or in the rain, it is difficult to assure reliable visual effectiveness.

In addition, since the post which has fitting grooves at its outer surface is buried in the ground at its lower portion, and is exposed to the outside environment at its major portion except that which is buried, when the post is subjected to a collision with an automobile, the fitting grooves of the post are damaged or crushed, thereby causing sliding of the holders to be difficult or impossible. As a result, the post must be frequently replaced, and the cost needed to repair the damaged post is considerably high.

In particular, because of the fitting grooves formed on the outer surface of the post, a lower part of the post is apt to be contaminated by extraneous material. Furthermore, since the appearance of the post is monotonous, it is difficult to expect visual improvement to the cityscape.

SUMMARY OF THE INVENTION

Accordingly, the present invention has been made keeping in mind the above problems occurring in the prior art, and an object of the present invention is to provide a signboard device which allows a signboard to be easily and stably installed on a post, and which has a signboard of an adequate thickness to minimize flexure and deformation due to collision with automobiles, wind, and the like.

Another object of the present invention is to provide a signboard device which allows one or more signboards to be installed on one post in various directions, if necessary.

Still another object of the present invention is to provide a signboard device which includes a signboard having an internal space sufficient to accommodate illumination components when desired, thereby assuring its visual effectiveness even under poor viewing conditions.

A further object of the present invention is to provide a signboard device which is adapted to protect its post from damage and breakage due to collision with automobiles, thereby enabling the post to be easily restored to the its normal state without replacement.

A further object of the present invention is to provide a signboard device with excellent suppression of oxidization and corrosion of associated components without requiring additional painting, so as to permanently maintain its favorable appearance and to extend its service life remarkably, and which provides an unique and acceptable appearance to improve cityscape.

In order to accomplish the above object, the present invention provides a signboard device comprising: a post having a plurality of dovetail-shaped fitting grooves at its outer surface; a base joined to anchor bolts on a concrete foundation, the base being centrally provided thereon with a post-seating stepped recess comprised of at least two concentric recesses having different diameters in which a lower end of the post is seated, and the base being provided around the post-seating recess with a plurality of radial support plates, inner sides of which come into contact with the outer surface of the post to support the post and are positioned on a boundary line between the at least two recesses; a post cover unit including a lower cover surrounding the support plates of the base, a cylindrical intermediate cover coupled to an upper end of the lower cover and surrounding the post, and an upper cover coupled to an upper end of the intermediate cover and fixed to the post; a signboard unit including a signboard frame assembly, which is provided at one of its vertical frames with a dovetail-shaped protrusion to be fitted into the dovetail-shaped fitting grooves of the post, and which is provided at its front and sides with stepped lines, and a pair of signboards seated on the stepped lines of the signboard frame assembly and attached thereto by attaching means, onto which desired information is displayed; and a stopper for affixing the signboard frame assembly to the post.

According to an aspect of the present invention, the two signboards of the signboard unit are made of a transparent material, and an illumination device is further provided between the two signboards.

According to another aspect of the present invention, the base, the post, the post cover unit and the signboard frame are made of a lightweight aluminum material having good corrosion resistance.

According to the present invention, the signboard unit can be easily installed on the post, and has excellent structural strength enough to resist flexure and deformation due to external force. A plurality of signboard units can be simply installed in all directions on a single post.

Since the signboard unit is provided therein with sufficient space, it is possible to provide remarkable visual effectiveness under poor viewing conditions when illumination equipment is provided in the space. Even when the signboard device is struck by another object, such as an automobile, the post is efficiently protected from external impact by the post cover unit, thereby enabling the damaged signboard device to be restored without replacement of the post.

Furthermore, since the components of the signboard device according to the present invention are made of rust-resistant aluminum, the signboard device can permanently preserve its original adaptable appearance without needing subsequent painting. Therefore, the pleasant appearance of the signboard device can be preserved for a long period of time, thereby contributing to improvement of cityscape, and its reparability and service life are considerably improved.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
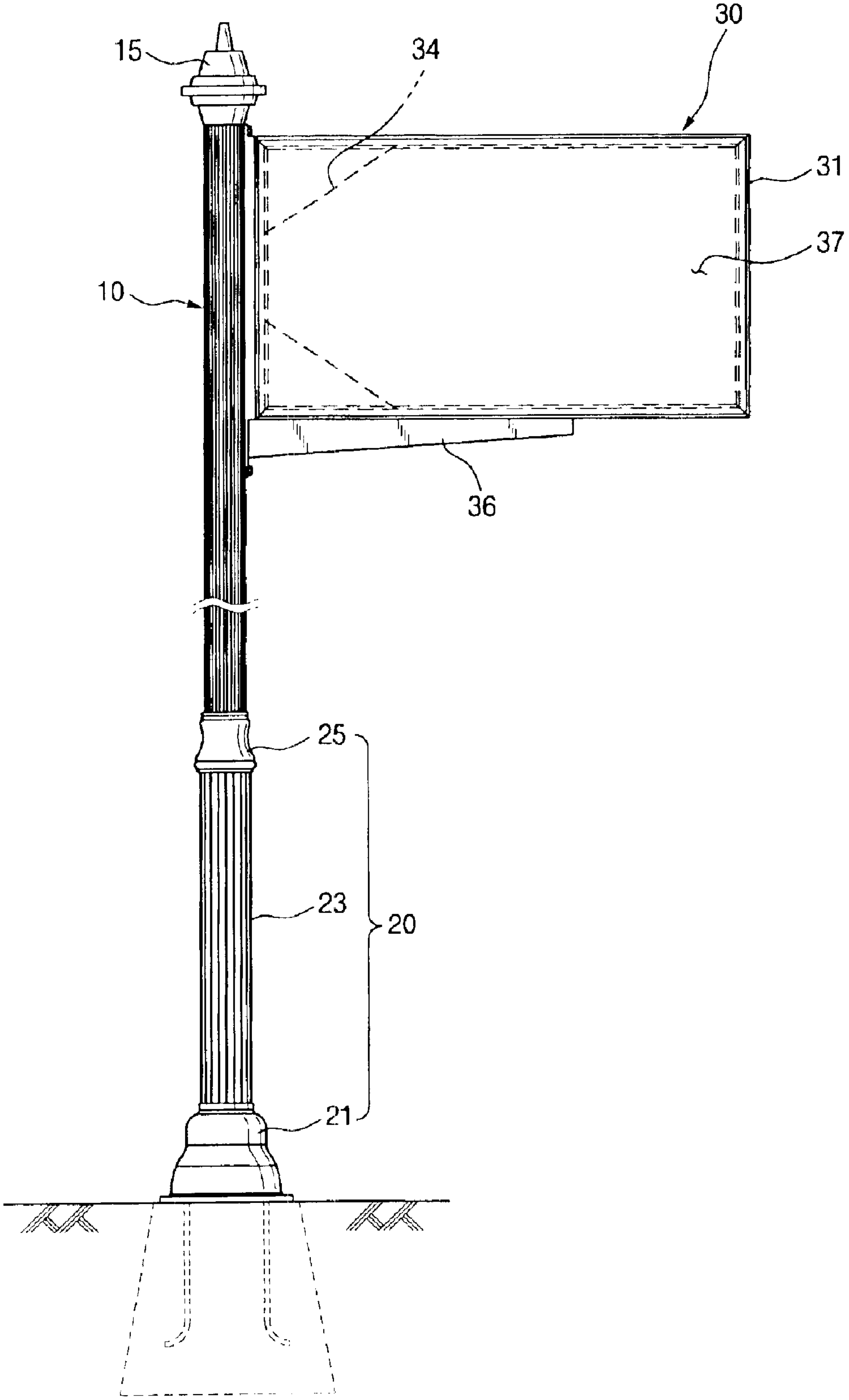
FIG. 1 is a front view showing a signboard device according to an embodiment of the present invention.
Figure 2:
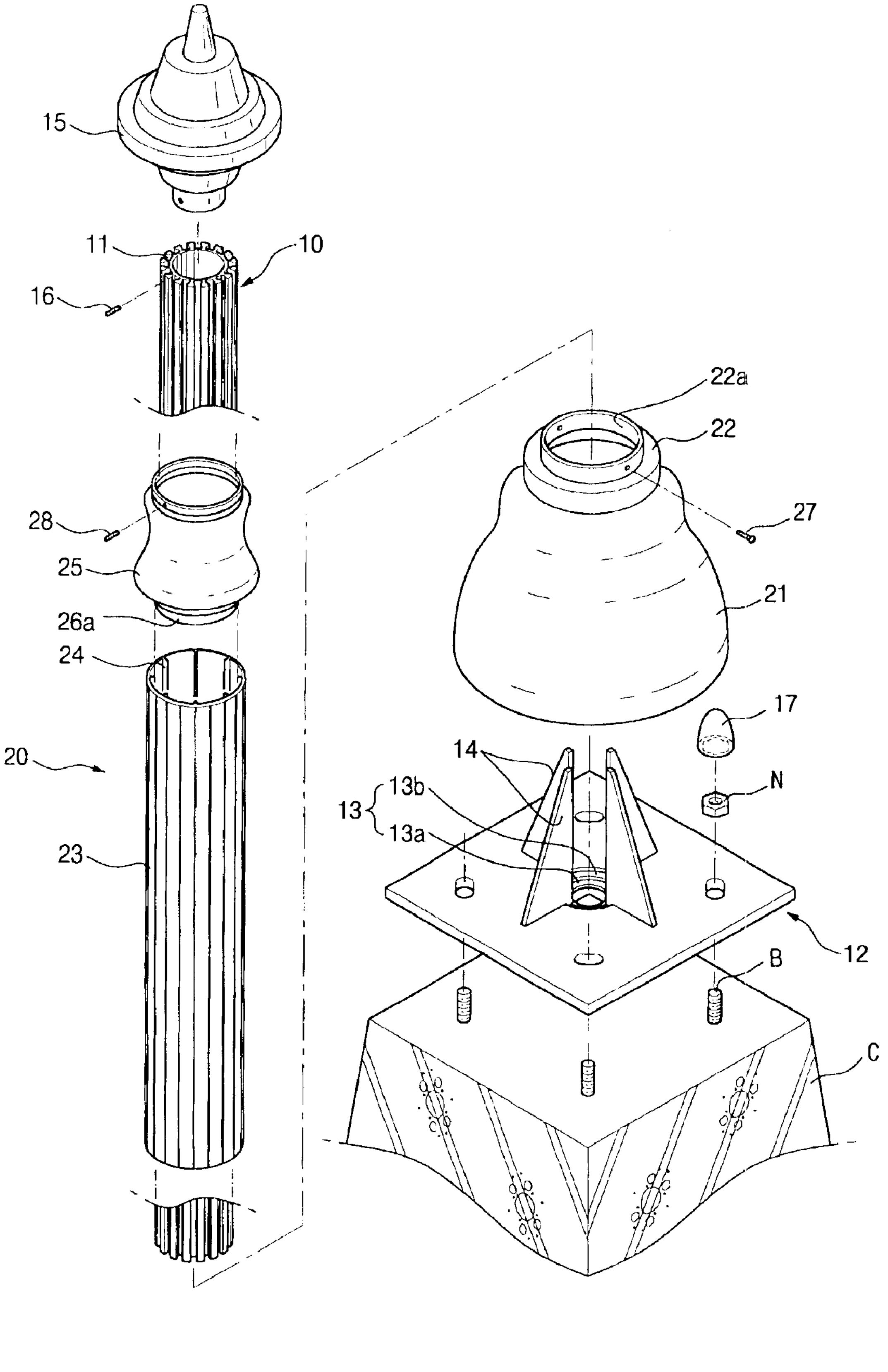
FIG. 2 is an exploded perspective view showing a post and a post cover unit of the signboard device according to the present invention.

This invention will be described in further detail by way of example with reference to the accompanying drawings.

Referring to FIGS. 1 to 6 of the drawings, there is shown a signboard device according to the present invention. As shown in FIGS. 1 to 6, the signboard device comprises a post 10 vertically installed on a roadside, a post cover unit 20 surrounding a lower portion of the post 10 to protect the portion from external impact, and a signboard unit 30 joined to an upper portion of the post in a cantilever manner to show desired information.

The post 10 is comprised of a pipe, for example, a pipe of circular section, and is provided at its outer circumferential surface with a plurality of dovetail-shaped fitting grooves 11 at a uniform interval. The post 10 is produced by extruding nonferrous metal having excellent corrosion resistance, preferably aluminum.

The post 10 is integrally provided at its lower end with a base-plate 12. Accordingly, the post can be vertically installed on a roadside, in such a way that the base-plate 12 is joined to anchor bolts "B" partially protruded from a concrete foundation "C" by tightening nuts "N" on the anchor bolts "B".

The base-plate 12 is centrally provided at its upper surface with a post-seating recess 13 into which a lower end of the post 10 is seated. A plurality of support plates 14, for example four support plates 14, are vertically disposed around the post-seating recess 13 at a uniform spacing, and are upwardly projected by a proper height, so as to support the lower portion of the post 10.

The post-seating recess 13 is preferably comprised of at least two stepped recesses 13*a*, 13*b* having different internal diameters and concentrically formed, so that the base-plate 12 can accommodate several posts 10, 10*a* having different diameters.

The plurality of support plates 14 are disposed such that inner sides of the support plates 14 are positioned at the boundary line between the inner recess 13*a* and the outer recess 13*b*. Consequently, inner portions of the support plates 14 radially intrude into the outer recess 13*b*. The base-plate 12 is produced from aluminum by a die-casting process.

Figure 3:
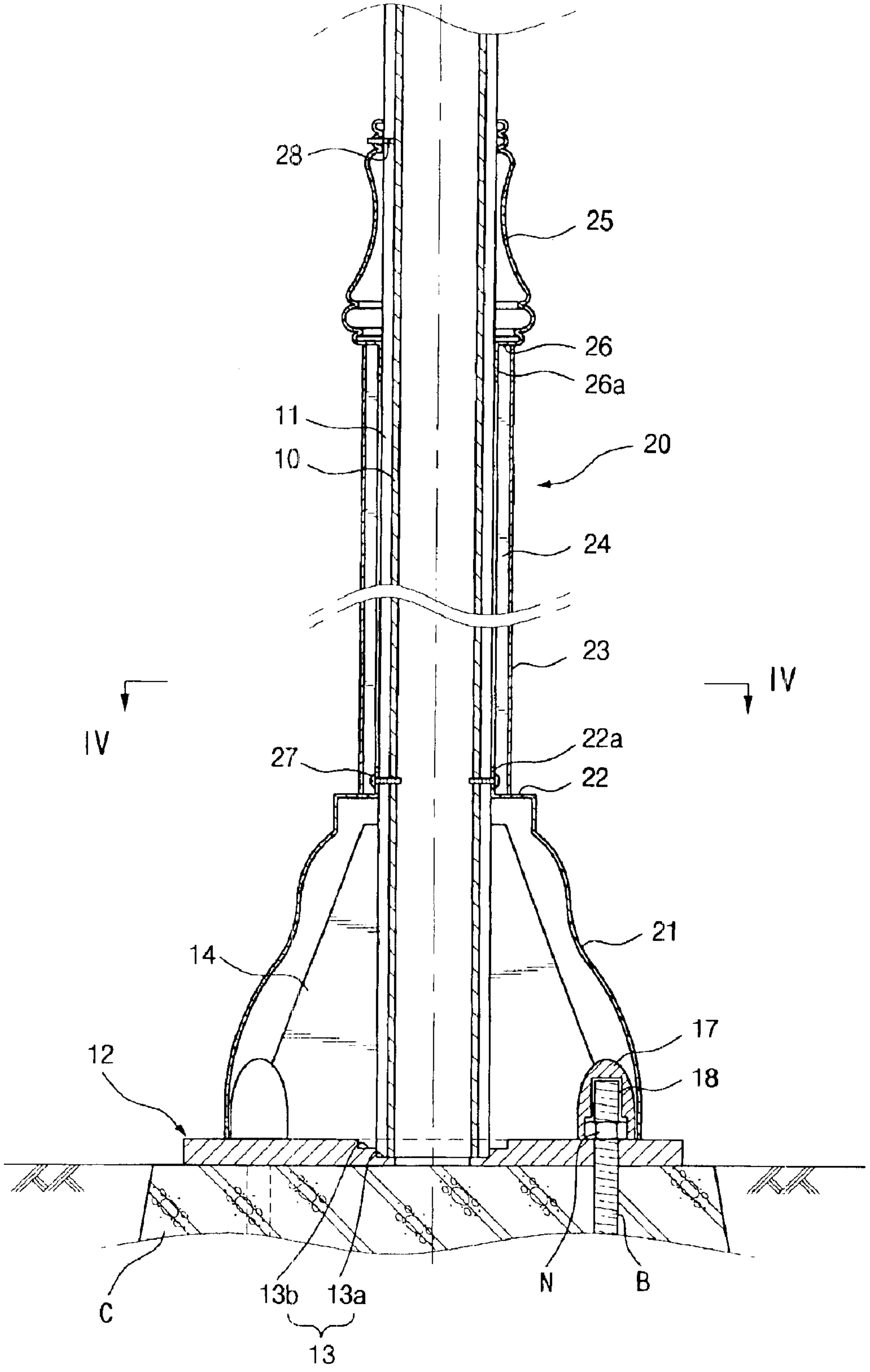
FIG. 3 is a cross-sectional view showing the signboard device according to the present invention, in which a post having a relatively small diameter is used.
Figure 4:
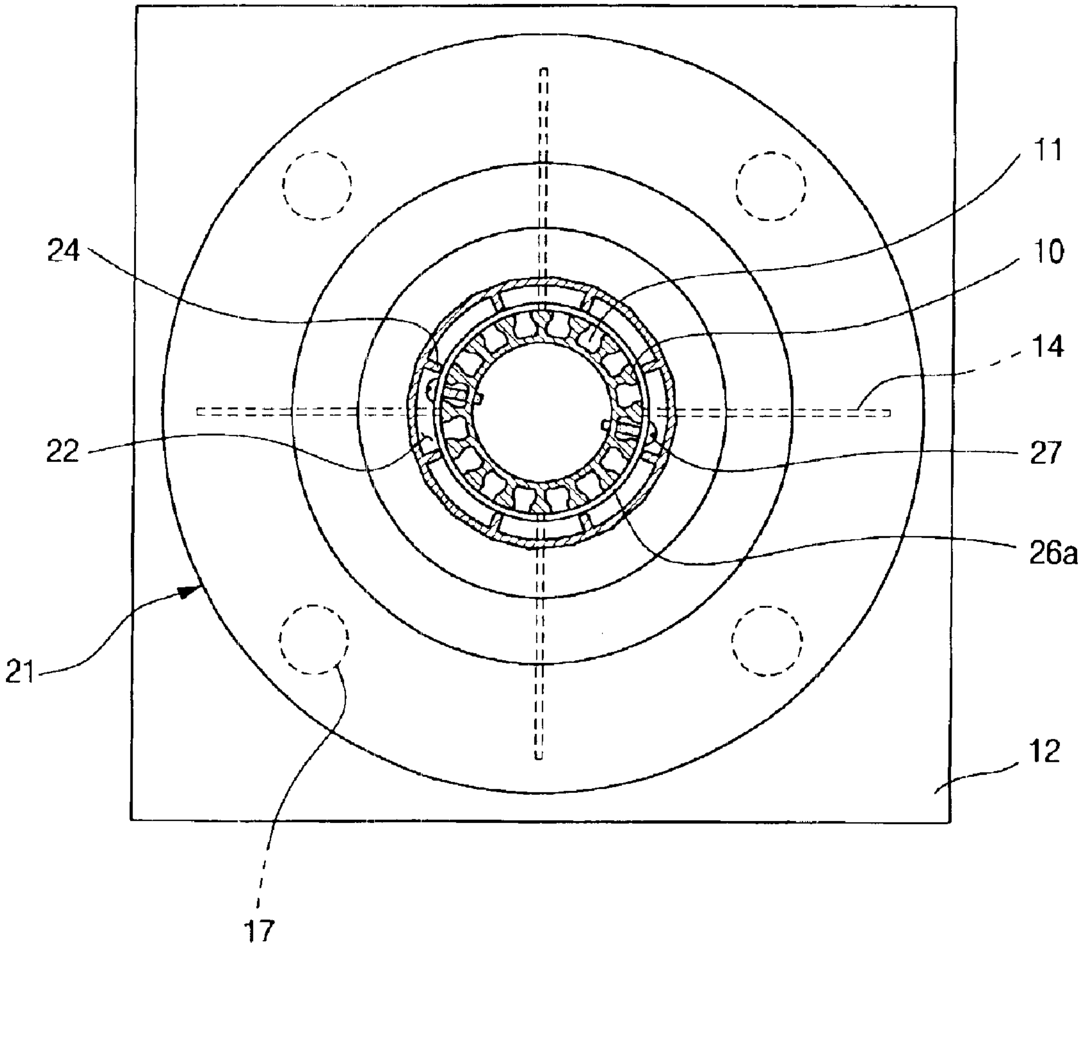
FIG. 4 is a cross-sectional view taken along line IV—IV of FIG. 3.
Figure 5:
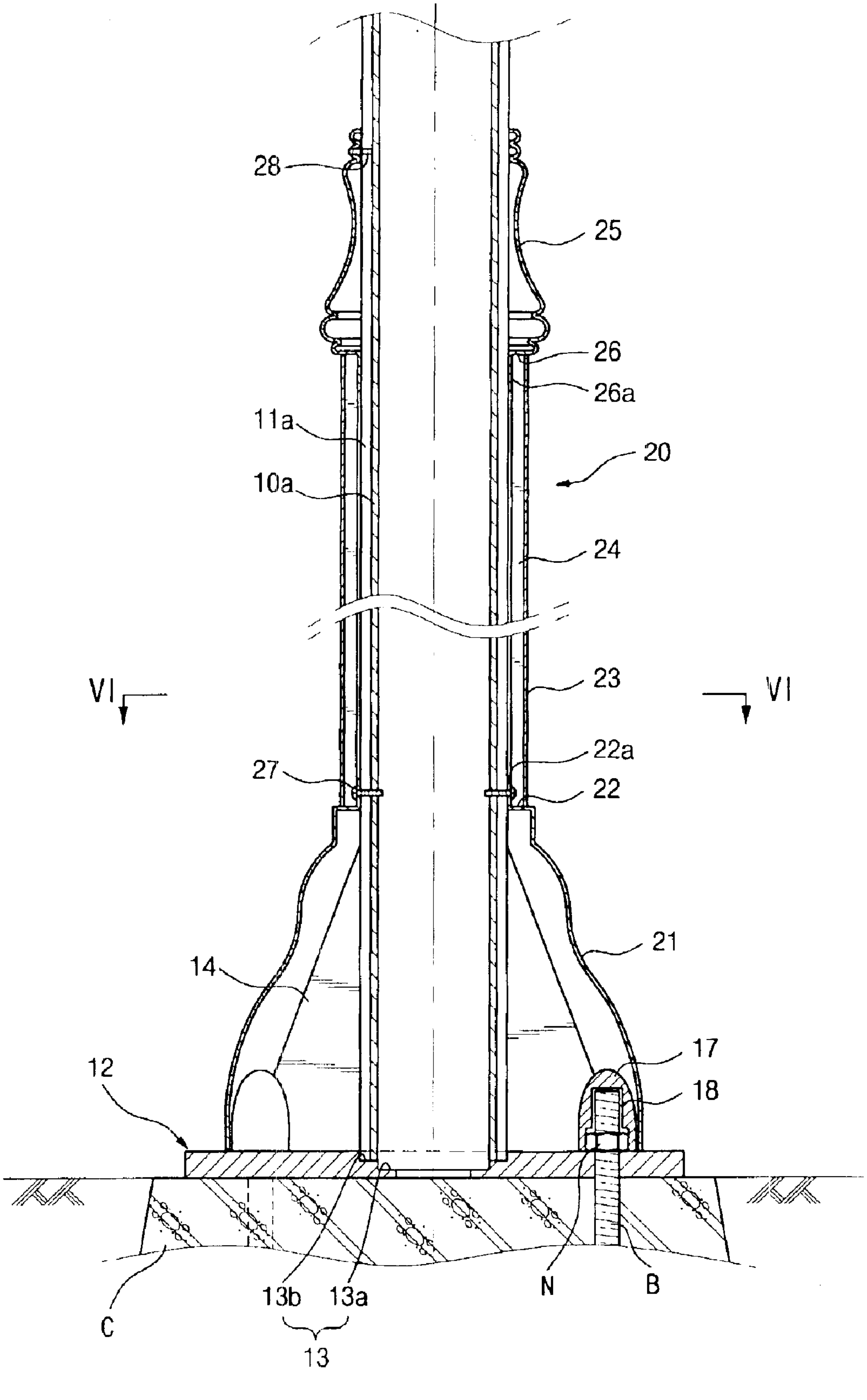
FIG. 5 is a cross-sectional view showing the signboard device according to the present invention, in which a post having a relatively large diameter is used.
Figure 6:
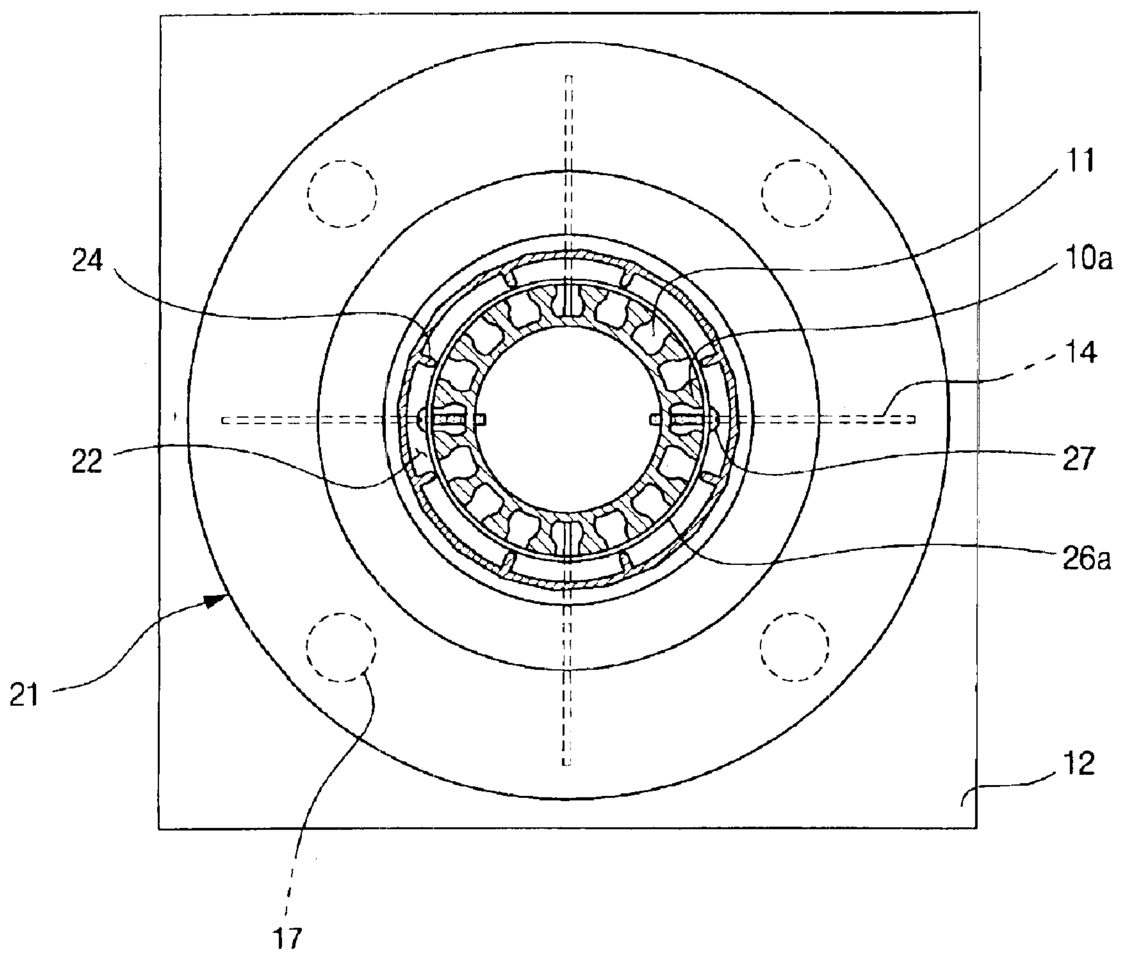
FIG. 6 is a cross-sectional view taken along line VI—VI of FIG. 5.
Figure 7A:
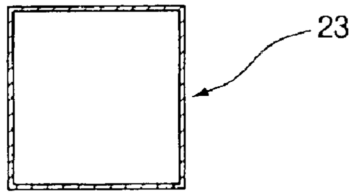
FIGS. 7A to 7E are horizontal cross-sectional views showing various post used in the signboard device of the present invention.
Figure 7B:
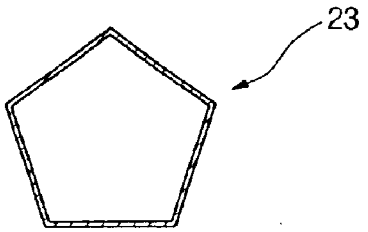
Figure 7C:
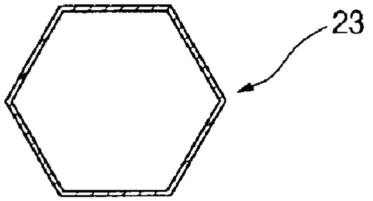
Figure 7D:
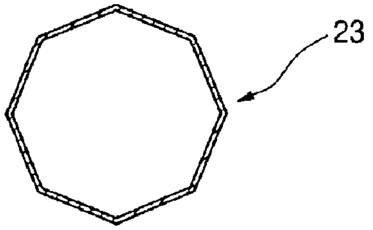
Figure 7E:
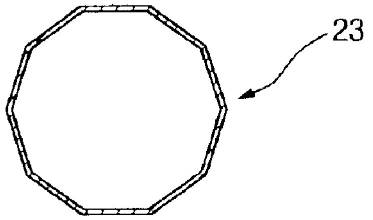

Accordingly, where the post 10 having a smaller external diameter is installed on the base-plate 12, the post 10 is seated on the inner post-seating recess 13*a* of the base-plate 12, and the inner sides of the support plates 14 are affixed to the outer surface of the post 10 by a welding process, as illustrated in FIGS. 3 and 4. On the other hand, where the post 10*a* having a larger external diameter is installed on the base-plate 12, the post 10*a* is seated on the outer post-seating recess 13*b* of the base-plate 12, and the inner sides of the support plates 14 are fit into the fitting grooves 11*a* of the post 10*a* and then welded thereto, as illustrated in FIGS. 5 and 6.

A crown member 15 is mounted on the upper end of the post 10 by a wrench bolt 16. Although the crown member 15 is also made of hollow aluminum material, the crown member 15 may be made of transparent material such as acrylic resin to accommodate illumination components (not shown), if necessary. In this case, electric wires from the illumination components are connected to underground cables through an internal passage of the post 10, like usual streetlights.

Accordingly, since the crown member 15 functions not only to serve as a streetlight but also to illuminate the signboard, visual effectiveness of the signboard device is enhanced even under poor viewing conditions.

Preferably, the anchor bolts "B" upwardly protruded from the base-plate 12 are covered with bolt cap 17 to protect the joined portions. In this case, the bolt caps 17 are filled with silicon 18 to assure reliable sealing efficiency. The bolt caps 17 are also made from aluminum to have good corrosion resistance.

The post cover unit 20 comprises a lower cover 21 surrounding a part of the cost 10 placed on the base-plate 12 to protect the part, a cylindrical intermediate cover 23 coupled to an upper end of the lower cover 21 and surrounding a lower portion of the post 10, and an upper cover 25 coupled to an upper end of the intermediate cover 23 and fixed to the post 10 to fix the post cover unit 20 to the post.

The lower cover 21 is shaped such that its lower portion is enlarged to cover the anchor bolts "B" and its upper portion is reduced. The lower cover 21 is provided at its upper end with a shoulder 22 on which the intermediate cover 23 is mounted, and an annular fitting rim 22*a* for allowing the intermediate cover 23 to be coupled to the lower cover 21. The lower cover 21 is fixedly mounted on the post 10 by joining the annular fitting rim 22*a* to the post 10 by bolts 27.

The intermediate cover 23 has a diameter somewhat larger than that of the post 10 to have an adequate gap therebetween, so as to minimize impact acting on the post due to external force such as collision with automobiles. The intermediate cover 23 is provided at its inner surface with a plurality radial reinforcing ribs 24 so as to reinforce its structural strength and assure stable supporting effectiveness with respect to the post 10.

An internal diameter defined by inner sides of the reinforcing ribs 24 is equal to or slightly smaller than a diameter of an annular fitting rim 26*a* of the upper cover 25, so that the fitting rim 22*a* of the lower cover 21 and the fitting rim 26*a* of the upper cover 25 are forcibly fitted into the upper and lower ends of the intermediate cover 23, thereby preventing a relative play between the upper and lower covers 25, 21 and the intermediate cover 23.

The intermediate cover 23 may have any shape in section other than a circular shape, as long as the intermediate cover can accommodate the post 10. For example, the intermediate cover 23 may freely adopt any one from various sectioned shapes such as polygonal shapes having four or more corners, as illustrated in FIGS. 7A to 7E.

The upper cover 25 is intended to fix the intermediate cover 23 to the post 10. The upper cover 25 is provided at its lower end with a bottom shoulder 26 and the fitting rim 26*a*, which function to allow the upper cover 25 to be coupled to the intermediate cover 23, and is joined to the post 10 at its upper end by tightening means such as a wrench bolt 28. The upper cover 25 is preferably designed in sufficient consideration of its exterior appearance, and may be properly modified in sectioned shape according to a sectioned shape of the intermediate cover 23.

The components associated to the post cover unit 20 may be also made from aluminum having lightness in weight and excellent corrosion resistance.

In this embodiment, the post cover unit 20 is selectively assembled according to a diameter of the post 10 or 10*a* to be used, such that a diameter of the lower end of the lower cover 21 is constant but diameters of the fitting rim 22*a* of the lower cover 21, the intermediate cover 23 and the upper cover 25 are equal to the diameter of the post 10 or 10*a*.

Figure 8:
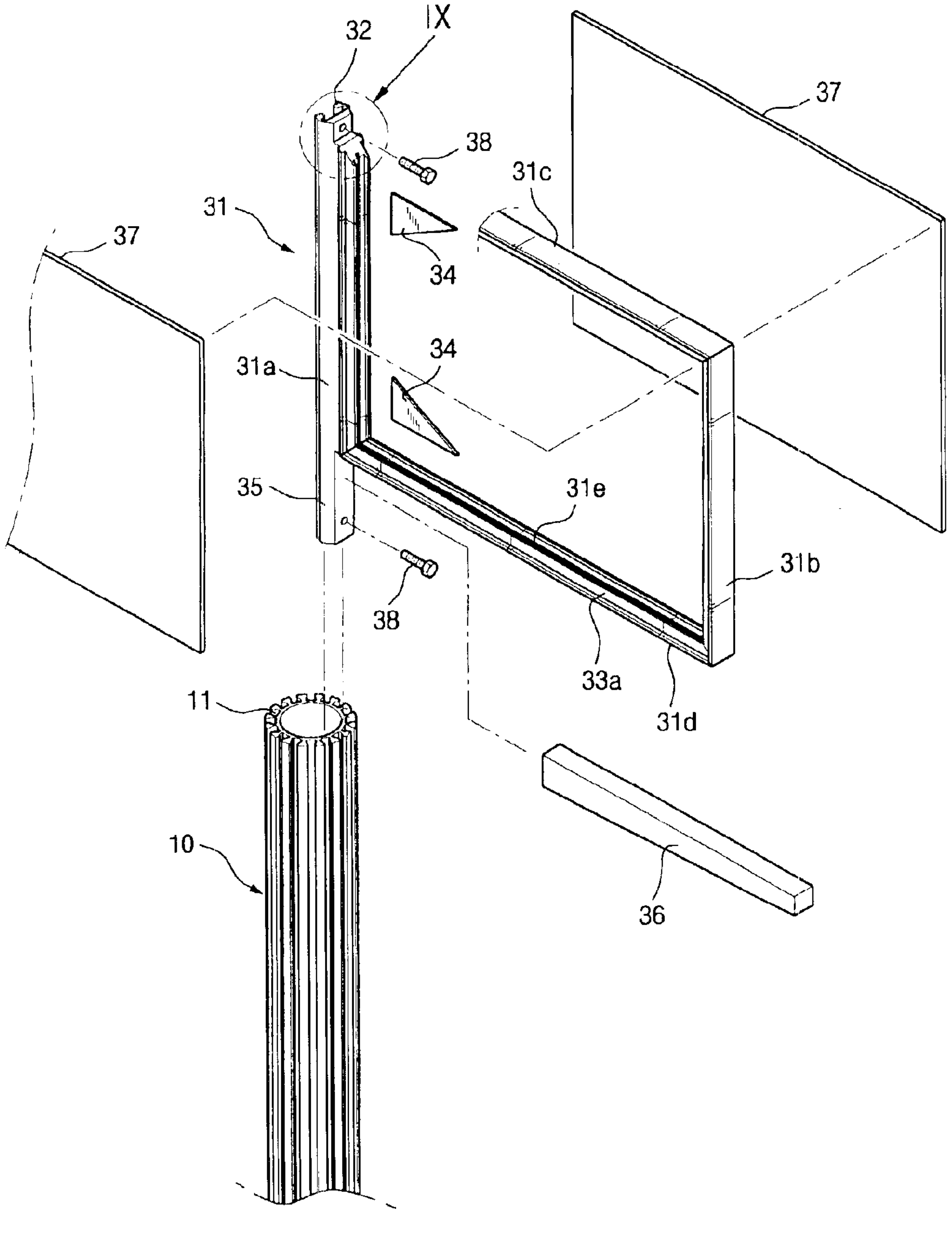
FIG. 8 is an exploded perspective view showing a signboard unit of the signboard device according to the present invention.
Figure 9:
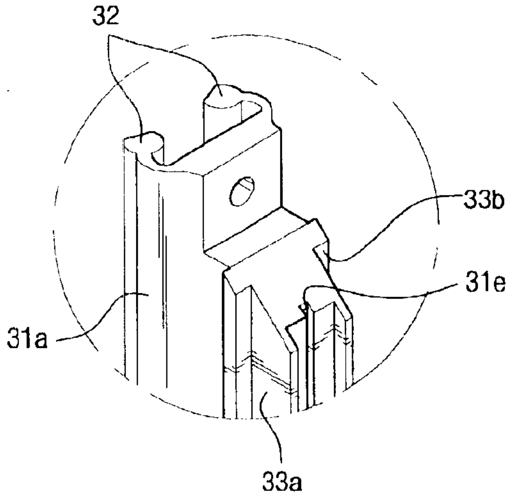
FIG. 9 is an enlarged perspective view of the circular portion IX of FIG. 8.
Figure 10:
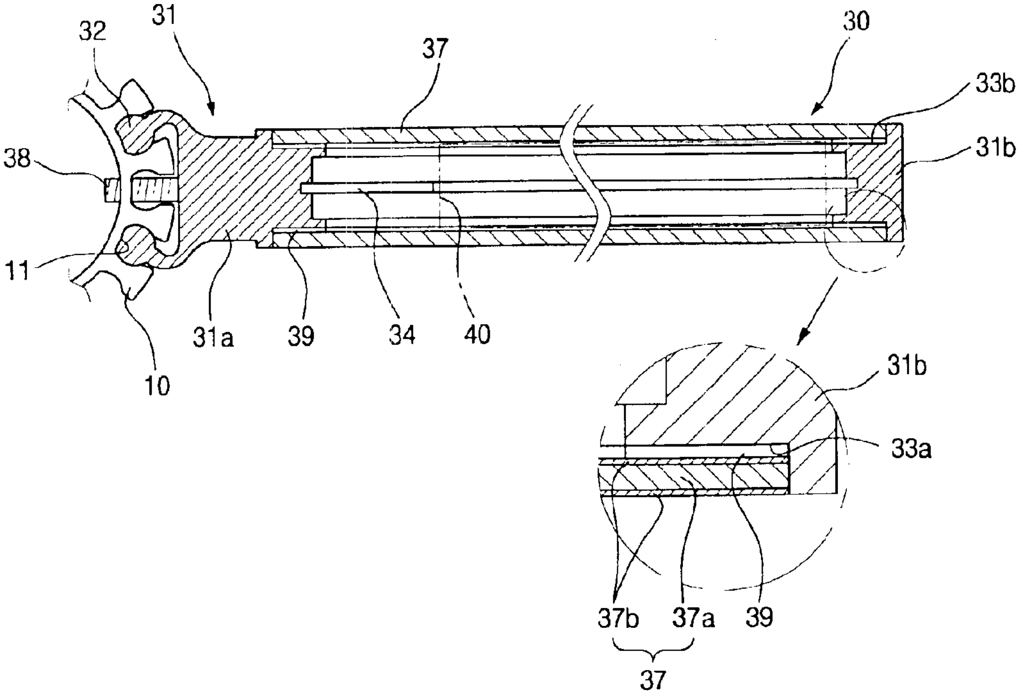
FIG. 10 is an enlarged cross-sectional view of the signboard unit shown in FIG. 8.

Referring to FIGS. 8 to 10, there is the signboard unit 30 according to the present invention. As shown in the drawings, the signboard unit 30 comprises a rectangular signboard frame assembly 31 supported on the upper portion of the post 10 in a cantilever manner, a pair of signboards 37 attached to both sides of the signboard frame assembly 31 with a spacing therebetween, and stoppers 38 for fixing the signboard frame assembly 31 to a desired position on the post 10.

The signboard frame 31 is comprised of a pair of vertical frames 31*a*, 31*b* and a pair of horizontal frames 31*c*, 31*d*, all of which are joined to one another at ends thereof by a welding process. One frame 31*a* of the pair of vertical frames is longitudinally provided at its outer surface with a pair of dovetail-shaped fitting rails 32, which are slidably fitted into the fitting grooves 11 of the post 10 to allow the signboard frame assembly 31 to be supported on the post 10 in a cantilever manner.

Although the pair of fitting rails 32 may be replaced with only one fitting rail, it is preferable that a pair of parallel fitting rails 32 are provided such that the pair of fitting rails 32 are fitted into two immediately adjacent fitting grooves 11 or two fitting grooves 11 with another fitting groove interposed therebetween, to assure more stable support for the signboard frame assembly 31.

Each of the vertical and horizontal frames constituting the signboard frame assembly 31 is provided at both sides in a thickness direction with stepped lines 33*a*, 33*b*, on which the signboards 37 are attached. The stepped lines 33*a*, 33*b* are formed to have an appropriate depth in consideration of a thickness of the signboards 37 and a thickness of adhesive layers.

Each of the vertical and horizontal frames constituting the signboard frame assembly 31 is also provided with support grooves 31*e* extended along the central lines of the frame members, so that at least two reinforcing ribs 34 are fitted into the support grooves 31*e* at inner corners of the signboard frame assembly 31 and welded thereto to increase a structural strength of the signboard frame assembly 31. The inner vertical frame 31*a* is provided at its lower end with a downward extension 35. A reinforcing bar 36 is attached to the extension 35 of the inner vertical frame 31*a* and the lower horizontal frame 31*d* by a welding process.

Although the signboard 37 may be various plates, it is preferable that it is manufactured by an aluminum composite plate, which is produced by coating aluminum films on both side surfaces of a synthetic resin plate 37*a* such as a polyethylene plate. The signboard 37 is attached to the stepped lines 33*a*, 33*b* of the signboard frame assembly 31 by double-faced adhesive tapes 39 as shown in FIG. 10.

The stopper 38 may be comprised of at least one of screw bolt, which is tightened into the post 10 through any one or both of upper and lower ends of the inner vertical frame 31*a*.

The signboard frame assembly 31 is sized to have a certain width. The two signboards 37 are attached to both side planes of the signboard frame assembly 21 with a gap defined therebetween. The gap defined by the pair of signboards 37 may be provided with an illumination device (not shown). A power source required to the illumination device may be introduced from underground burial cables through electric wires disposed in a hollow space in the post 10.

In this case, the signboards 37 may be made by transparent plates such as acrylic resin plates, so as to improve visual effectiveness under poor viewing conditions such as at night or in the rain.

Where there is no illumination device, a spacer 40 made of compressed polystyrene foam is preferably interposed between the signboards 37 so as to increase the adhesive power and structural strength of the signboards 37.

According to the signboard device according to the present invention, since the signboard unit 30 can be easily installed on the post by a simple operation of fitting the fitting rails 32 of the signboard frame assembly 31 into the fitting grooves 11 formed on an outer surface of the post 10 and fixing the signboard frame assembly 31 to the post 10 by the stoppers 38, an operation of installing the signboard device is simplified, and a plurality of signboard units 30 can be installed in all directions on a single post 10.

Since the signboard unit 30 is comprised of the signboard frame assembly 31 having an adequate width and the signboards 37 attached to both sides of the signboard frame assembly 31, the signboard unit 30 is excellent in its structural strength, thereby minimizing flexure and deformation due to collision with automobiles, the force of the wind, and the like. Furthermore, since the signboard unit 30 is provided therein with sufficient space, it is possible to assure excellent visual effectiveness even under poor viewing conditions by incorporating an illumination device thereinto.

In addition, since the post 10 is protected by the post cover unit 20 at its major portion, the post cover unit 20 absorbs external impact when the post cover unit 20 is struck by external objects such as automobiles, thereby assuring optimal protection for the post 10. Therefore, the damaged post 10 can be restored to its normal state without need for replacement.

Furthermore, since the components of the signboard device according to the present invention are made of aluminum having excellent corrosion resistance, the signboard device can permanently preserve its original adaptable appearance without need for additional painting. In addition to this, the post cover unit 20 also serves to improve the overall appearance of the signboard device, thereby contributing to visual improvement of the cityscape.

Figure 11:
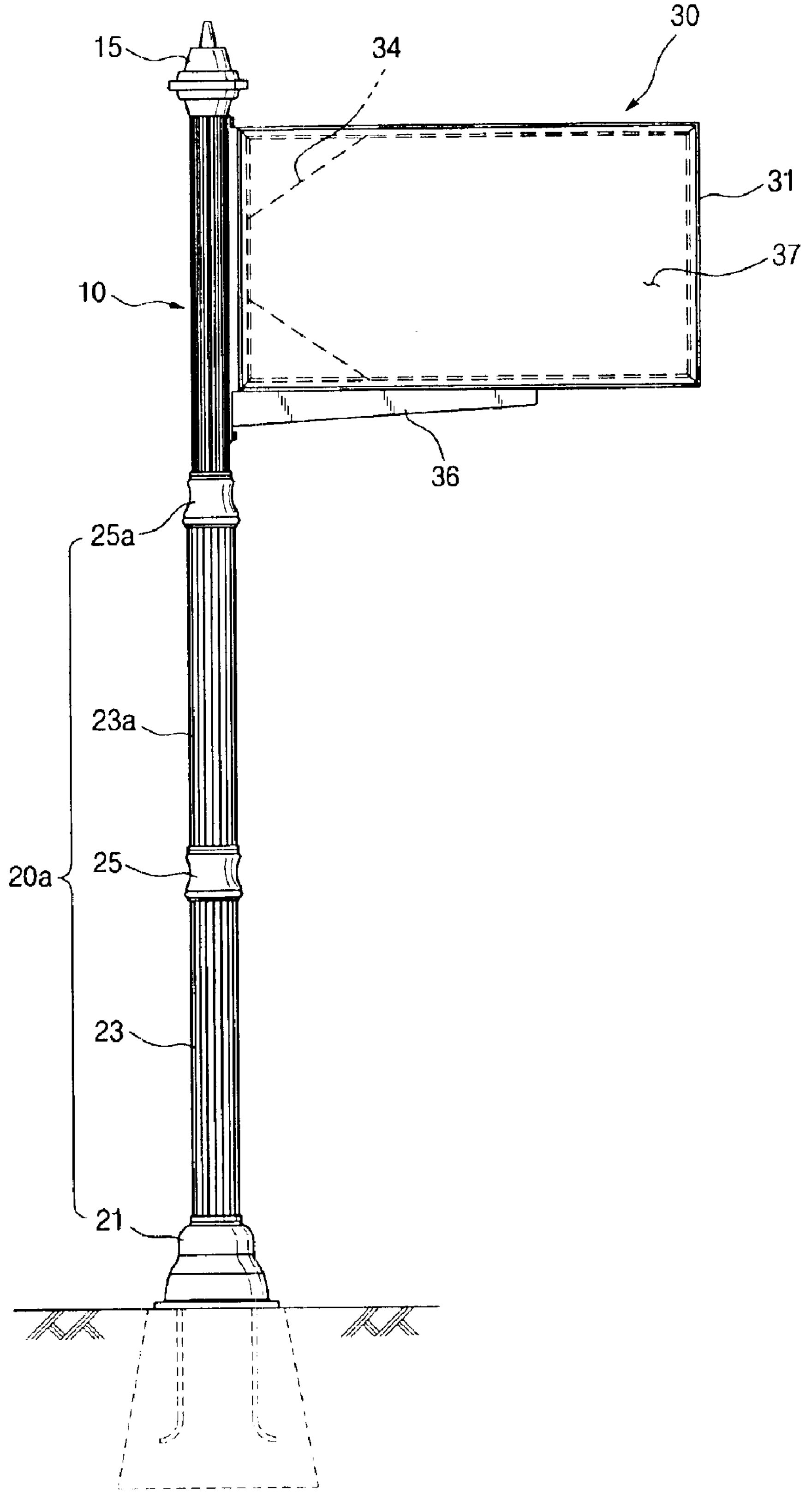
FIG. 11 is a front view showing a signboard device according to another embodiment of the present invention.

Referring to FIG. 11, there is shown a signboard device according to another embodiment of the present invention. As shown in the drawing, a post cover unit 20*a* according to this embodiment includes a pair of intermediate covers 23, 23*a*, and a pair of upper covers 25, 25*a*, which are alternately disposed, unlike the post cover unit 20 of the previous embodiment.

According to this embodiment, since post cover units 20*a* protect the post 10 at its major portion, except at a portion on which the signboard unit 30 is installed, an overall appearance of the signboard device can be further improved.

As described above, the present invention provides a signboard device in which a signboard is easily installed on a post and which has an excellent structural strength, sufficient to prevent flexure or deformation due to collision by automobiles or the force of the wind, and which enables a plurality of signboards to be installed in all directions, if necessary, on a single post.

The signboard may be provided therein with an illumination device, so as to provide remarkable visual effectiveness under poor viewing conditions. Since the post of the signboard device is protected from external impact by a cover unit, the post can be restored without need for its replacement.

In addition, since the components of the signboard device according to the present invention are made of aluminum material having excellent corrosion resistance, the components are not readily oxidized or corroded, and thus overall appearance is improved, thereby improving the cityscape.

Accordingly, the signboard device according to the present invention has various advantages in ease of field construction, lengthening of service life, remarkable visual effectiveness, and improvement of cityscape.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A signboard device comprising:

a post having a plurality of dovetail-shaped fitting grooves at its outer surface;

a base joined to anchor bolts of a concrete foundation, the base being centrally provided thereon with post-seating stepped recesses comprised of at least two concentric recesses having different diameters in which a lower end of the post is seated, and the base being provided around the post-seating recesses with a plurality of radial support plates, inner sides of which come into contact with the outer surface of the post to support the post;

a post cover unit including a lower cover surrounding the support plates of the base, a cylindrical intermediate cover coupled to an upper end of the lower cover and surrounding the post, and an upper cover coupled to an upper end of the intermediate cover and fixed to the post; and a signboard unit supported on an upper portion of the post in a cantilever manner to show desired information, the signboard unit being provided at its one side with a pair of dovetail-shaped rails being fitted into the dovetail-shaped fitting grooves of the post.

2. The signboard device as set forth in claim 1, wherein the intermediate cover of the post cover unit is provided at its inner surface with a plurality of reinforcing ribs, inner ends of which come into contact with the outer surface of the post.

3. The signboard device as set forth in claim 1, wherein the post cover unit is further comprised of an additional intermediate cover and an additional upper cover, which are alternately disposed on the post to cover a major portion of the post, except a portion being fitted to the pair of dovetail-shaped rails provided at the one side of the signboard unit.

4. The signboard device as set forth in claim 1, wherein the support plates of the base are positioned such that inner sides of the support plates come into contact with the outer surface of the post when the post has a relatively small diameter and is seated in an inner recess of the post-seating stepped recesses comprised of the at least two concentric recesses while the inner sides of the support plates are fitted into the fitting grooves of the post when the post has a relatively large diameter and is seated in an outer recess of the stepped recesses.

5. The signboard device as set forth in claim 1, wherein a sectioned shape of the post cover unit is selected from a group consisting of a circular shape and polygonal shapes having four or more corners.

6. The signboard device as set forth in claim 5, wherein a sectioned shape of the upper cover varies according to a sectioned shape of the intermediate cover.

7. The signboard device as set forth in claim 1, wherein the post is provided at its top with a crown member having a certain shape.

8. The signboard device as set forth in claim 1, wherein the anchor bolts, upwardly protruded from the base, are covered with bolt caps.

9. The signboard device as set forth in claim 1, wherein the post, the base, the post cover unit and the signboard unit are made of aluminum material.

10. A signboard device comprising:

a post having a plurality of dovetail-shaped fitting grooves at its outer surface;

a base joined to anchor bolts of a concrete foundation, the base being centrally provided thereon with post-seating stepped recesses comprised of at least two concentric recesses having different diameters in which a lower end of the post is seated, and the base being provided around the post-seating recesses with a plurality of radial support plates, inner sides of which come into contact with the outer surface of the post to support the post;

a post cover unit including a lower cover surrounding the support plates of the base, a cylindrical intermediate cover coupled to an upper end of the lower cover and surrounding the post, and an upper cover coupled to an upper end of the intermediate cover and fixed to the post;

a signboard unit including a signboard frame assembly, the signboard frame assembly is provided at its one vertical frame with a pair of dovetail-shaped protrusions to be fitted into of the dovetail-shaped fitting grooves of the post, and the signboard frame assembly is provided at its front and sides with stepped lines, and a pair of signboards having desired information displayed thereon, the pair of signboards seated on the stepped lines of the signboard frame assembly and attached thereto by attaching means; and a stopper for fixing the signboard frame assembly to the post.

11. The signboard device as set forth in claim 10, wherein the post cover unit is further comprised of an additional intermediate cover and an additional upper cover, which are alternately disposed on the post to cover a major portion of the post except the a portion being fitted to the pair of dovetail-shaped rails provided at one side of the signboard unit.

12. The signboard device as set forth in claim 10, wherein the vertical frame of the signboard frame assembly, which has a fitting protrusion, is downwardly extended at its lower portion by a certain length, and further comprising a reinforcing bar attached to the extension of the vertical frame and a lower horizontal frame of the signboard frame assembly.

13. The signboard device as set forth in claim 10, wherein the signboard frame assembly includes support grooves extended along inner central lines thereof, and further comprising at least two reinforcing ribs fitted into the support grooves at inner corners of the signboard frame assembly and fixed thereto.

14. The signboard device as set forth in claim 10, wherein the pair of signboards are provided with a spacer interposed therebetween to support the signboards.

15. The signboard device as set forth in claim 10, wherein the attaching means is comprised of double-faced adhesive tape.

16. The signboard device as set forth in claim 10, wherein the signboard frame assembly is made of aluminum material.

* * * * *